United States Patent
Suyama (10) Patent No.: US 12,308,470 B2
(45) Date of Patent: May 20, 2025

(54) ZINC SECONDARY BATTERY AND SEPARATOR FOR ZINC SECONDARY BATTERY

(71) Applicant: TOYOTA JIDOSHA KABUSHIKI KAISHA, Toyota (JP)

(72) Inventor: Hiroshi Suyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 18/377,385

(22) Filed: Oct. 6, 2023

(65) Prior Publication Data

US 2024/0047824 A1     Feb. 8, 2024

Related U.S. Application Data

(63) Continuation of application No. 17/391,426, filed on Aug. 2, 2021, now Pat. No. 12,087,968.

(30) Foreign Application Priority Data

Sep. 30, 2020    (JP) ................................. 2020-165355

(51) Int. Cl.
     *H01M 50/446*      (2021.01)
     *H01M 50/417*      (2021.01)
     (Continued)

(52) U.S. Cl.
     CPC ....... *H01M 50/446* (2021.01); *H01M 50/417* (2021.01); *H01M 50/423* (2021.01); *H01M 50/46* (2021.01)

(58) Field of Classification Search
CPC . H01M 50/124; H01M 50/126; H01M 50/446
See application file for complete search history.

(56) References Cited

U.S. PATENT DOCUMENTS

| | | |
|---|---|---|
| 2005/0079424 A1 | 4/2005 | Davis et al. |
| 2015/0155536 A1 | 6/2015 | Suzuki |
| | (Continued) | |

FOREIGN PATENT DOCUMENTS

| | | |
|---|---|---|
| CN | 104335390 A | 2/2015 |
| JP | 2016-146263 A | 8/2016 |
| | (Continued) | |

OTHER PUBLICATIONS

Mar. 4, 2024 Office Action issued in U.S. Appl. No. 17/391,426.
(Continued)

*Primary Examiner* — Stephan J Essex
(74) *Attorney, Agent, or Firm* — Oliff PLC (57) ABSTRACT

A zinc secondary battery includes a negative electrode body, a separator for the zinc secondary battery, and a positive electrode body provided in this order, and each impregnated with an electrolyte. The negative electrode body includes a negative electrode active material layer including zinc and zinc oxide. The positive electrode body includes a positive electrode active material layer including at least one nickel hydroxide or nickel oxyhydroxide. The separator includes a zirconium sulfate-containing porous layer and at least one porous base material layer that are stacked on each other, wherein the zirconium sulfate-containing porous layer includes a porous layer with zirconium sulfate particles adhered to the porous layer.

7 Claims, 4 Drawing Sheets

(51) Int. Cl.
  *H01M 50/423* (2021.01)
  *H01M 50/46* (2021.01)

(56) References Cited

U.S. PATENT DOCUMENTS

2016/0344037 A1   11/2016   Tsuji et al.
2018/0269479 A1   9/2018    Zhamu et al.

FOREIGN PATENT DOCUMENTS

| JP | 6558906 B2 | 8/2019 |
| JP | 2019-216057 A | 12/2019 |
| WO | 2015115592 A1 | 8/2015 |

OTHER PUBLICATIONS

Dec. 20, 2022 Office Action issued in U.S. Appl. No. 17/391,426.
Jul. 6, 2023 Notice of Allowance issued in U.S. Appl. No. 17/391,426.
Jun. 11, 2024 Notice of Allowance issued in U.S. Appl. No. 17/391,426.

ZINC SECONDARY BATTERY AND SEPARATOR FOR ZINC SECONDARY BATTERY

CROSS-REFERENCE TO RELATED APPLICATION

This application is a continuation of U.S. application Ser. No. 17/391,426 filed on Aug. 2, 2021, which claims priority to Japanese Patent Application No. 2020-165355 filed on Sep. 30, 2020, both of which are incorporated herein by reference in their entireties.

BACKGROUND

1. Technical Field

The present disclosure relates to a zinc secondary battery and a separator for a zinc secondary battery.

2. Description of Related Art

It has been known that in a zinc secondary battery, such as a nickel-zinc secondary battery or a zinc-air secondary battery, in a case where charging and discharging are repeated, zinc that configures a negative electrode body forms dendrite. In a case where the dendrite grows and reaches a positive electrode body beyond a separator, a short circuit may occur caused by this dendrite. Therefore, in the zinc secondary battery, a technique for suppressing the short circuit due to the growth of the dendrite is requested.

In this regard, Japanese Unexamined Patent Application Publication No. 2019-216057 (JP 2019-216057 A) discloses a porous film disposed between a positive electrode body and a negative electrode body of a zinc battery, in which metal oxide having 5 to 11 isoelectric points is contained. Also, JP 2019-216057 A discloses titanium dioxide, aluminum oxide, and beryllium oxide as an example of the metal oxide contained in the porous film.

SUMMARY

As described above, in the zinc secondary battery, the short circuit due to the zinc dendrite grown from the negative electrode body reaching the positive electrode body is requested to be suppressed.

JP 2019-216057 A discloses that the short circuit can be suppressed by the porous film disclosed in the same document. However, further suppressing the short circuit of the zinc secondary battery is requested.

The present disclosure provides a separator for a zinc secondary battery capable of suppressing a short circuit of a zinc secondary battery.

A first aspect of the present disclosure relates to a separator for a zinc secondary battery including a zirconium sulfate-containing porous layer and a porous base material layer that are stacked on each other.

The porous base material layer, the zirconium sulfate-containing porous layer, and the porous base material layer may be stacked in this order.

A nonwoven fabric layer, the porous base material layer, the zirconium sulfate-containing porous layer, and the porous base material layer may be stacked in this order.

The porous base material layer may be a resin porous layer.

The resin porous layer may be a polyolefin-based porous layer, a polyamide-based porous layer, or a nylon-based porous layer.

A second aspect of the present disclosure relates to a zinc secondary battery including the separator for the zinc secondary battery according to the first aspect.

A negative electrode body, the separator for a zinc secondary battery, and a positive electrode body may be provided in this order, and the negative electrode body, the separator for the zinc secondary battery, and the positive electrode body may be impregnated with an electrolyte.

The electrolyte may be an aqueous solution.

The electrolyte may be an alkaline electrolyte.

Zinc oxide may be dissolved in the electrolyte.

According to the present disclosure, it is possible to provide a separator for a zinc secondary battery capable of suppressing a short circuit of a zinc secondary battery.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described below in detail. Noted that the present disclosure is not limited to the following embodiments, and can be variously modified and implemented within the scope of the gist of the disclosure.

Separator for Zinc Secondary Battery

A separator for a zinc secondary battery according to the present disclosure is a separator for a zinc secondary battery having a zirconium sulfate-containing porous layer and a porous base material layer stacked on each other.

In a zinc secondary battery to which the separator for the zinc secondary battery according to the present disclosure can be applied is, for example, a zinc secondary battery in which a negative electrode body, the separator, and a positive electrode body may be accommodated in a battery case in this order and the battery case may be filled with an electrolyte. More specific examples of the zinc secondary battery that can adopt the separator for the zinc secondary battery according to the present disclosure include a nickel-zinc secondary battery, a silver oxide-zinc secondary battery, a manganese oxide-zinc secondary battery, a zinc-air secondary battery, and other various alkaline zinc secondary batteries.

Although not limited by the principle, the principle that a short circuit of the zinc secondary battery can be suppressed by the separator for the zinc secondary battery according to the present disclosure is considered as below.

In the zinc secondary battery, by repeating charging and discharging, zinc dendrite may grow from the negative electrode body and reach the positive electrode body beyond the separator and cause the short circuit of the zinc secondary battery.

One of the causes of the zinc dendrite is considered that Zn produced by reduction of $Zn(OH)_4^{2-}$ in the electrolyte is unevenly precipitated on the negative electrode body. Accordingly, it is conceivable to suppress the growth of the zinc dendrite by suppressing the supply of $Zn(OH)_4^{2-}$ to the zinc dendrite, thereby suppressing the short circuit of the zinc secondary battery.

Here, as means for suppressing the supply of $Zn(OH)_4^{2-}$ to the zinc dendrite, the separator having a porous layer of a material that tends to electrostatically repel with $Zn(OH)_4^{2-}$ is conceivable to be adopted as the separator of the zinc secondary battery.

In this regard, the present discloser has found that the durability of the zinc secondary battery can be particularly improved by adopting a porous layer that contains zirconium sulfate, that is, a zirconium sulfate-containing porous layer as a component of the separator.

Zirconium sulfate has low solubility in the electrolyte adopted in the zinc secondary battery, for example, an alkaline electrolyte. Further, it is considered that since zirconium sulfate has a configuration in which sulfate groups are disposed around zirconium atoms, the dipole moment is large and a surface thereof is negatively charged.

It is considered that the zirconium sulfate-containing porous layer is stable in the electrolyte due to the property of zirconium sulfate and can suppress the supply of $Zn(OH)_4^{2-}$ from the positive electrode body side by electrostatic repulsion. Note that $Zn(OH)_4^{2-}$ is generally produced at the time of discharging on the negative electrode body side. However, in actual, a certain amount of ZnO or the like is dissolved in the electrolyte, and it is considered that the ZnO concentration of the electrolyte becomes uneven at the time of charging and discharging and $Zn(OH)_4^{2-}$ may be produced on the positive electrode body side due to the uneven concentration.

Figure 1:
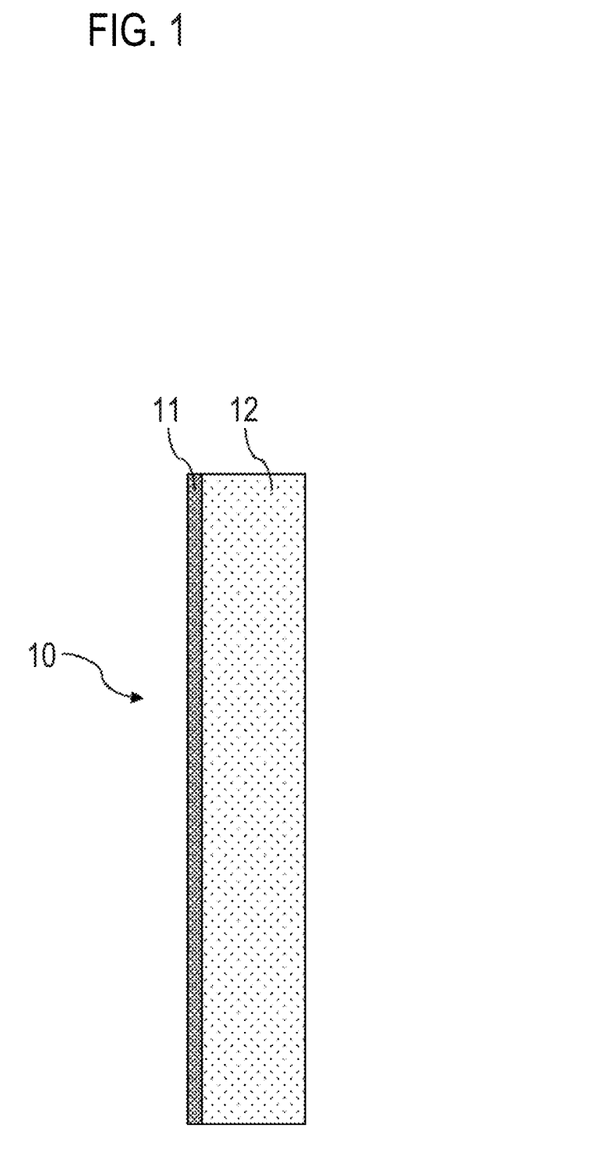
FIG. 1 is a schematic view showing a separator 10 for a zinc secondary battery according to a first embodiment of the present disclosure.

FIG. 1 shows a separator 10 for a zinc secondary battery according to a first embodiment of the present disclosure.

As shown in FIG. 1, the separator 10 for the zinc secondary battery according to the first embodiment of the present disclosure includes a zirconium sulfate-containing porous layer 11 and a porous base material layer 12 that are stacked on each other.

Note that FIG. 1 is not intended to limit the separator for the zinc secondary battery according to the present disclosure.

The separator for the zinc secondary battery according to the present disclosure may have a configuration in which the porous base material layer, the zirconium sulfate-containing porous layer, and the porous base material layer are stacked in this order.

In a case where the separator for the zinc secondary battery according to the present disclosure has such a configuration, zirconium sulfate can be suppressed from slipping off from the zirconium sulfate-containing porous layer. As a result, the durability of the zirconium sulfate-containing porous layer can be improved, and therefore the short circuit of the zinc secondary battery can be further suppressed. Further, by interposing the porous base material layer between the zirconium sulfate-containing porous layer and the positive electrode body, the zirconium sulfate-containing porous layer and the positive electrode body can be suppressed from coming into direct contact with each other.

Figure 2:
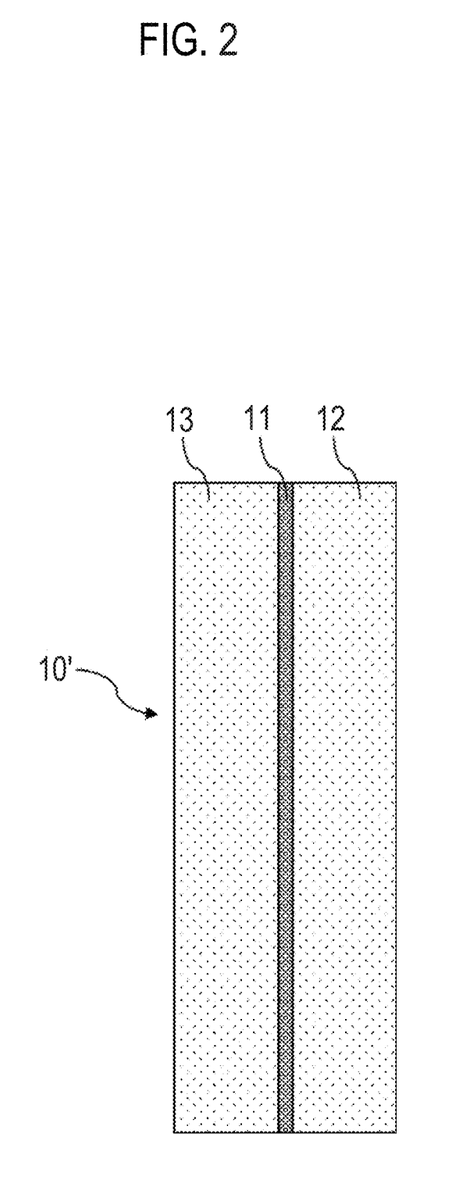
FIG. 2 is a schematic view showing a separator 10' for a zinc secondary battery according to a second embodiment of the present disclosure.

FIG. 2 shows a separator 10' for a zinc secondary battery according to a second embodiment of the present disclosure.

As shown in FIG. 2, in the separator 10' for the zinc secondary battery according to the second embodiment of the present disclosure, a porous base material layer 13, the zirconium sulfate-containing porous layer 11 and the porous base material layer 12 are stacked in this order.

Note that FIG. 2 is not intended to limit the separator for the zinc secondary battery according to the present disclosure.

Further, the separator for the zinc secondary battery according to the present disclosure may have a configuration in which a nonwoven fabric layer, the porous base material layer, the zirconium sulfate-containing porous layer, and the porous base material layer are stacked in this order.

In a case where the separator for the zinc secondary battery according to the present disclosure has such a configuration, by disposing the nonwoven fabric layer between the negative electrode body and the porous base material layer of the separator for the zinc secondary battery according to the present disclosure, the electrolyte is easily held between the negative electrode body and the porous base material layer. Further, in a case where the separator for the zinc secondary battery according to the present disclosure has such a configuration, the distance between the surface of the negative electrode body on which the zinc dendrite is formed and the separator for the zinc secondary battery according to the present disclosure can be increased. As a result, a surface area at a tip of the zinc dendrite that extends to a side of the separator for the zinc secondary battery according to the present disclosure is decreased. Therefore, $Zn(OH)_4^{2-}$ supplied to the tip of the zinc dendrite that extends to a side of the separator for the zinc secondary battery according to the present disclosure can be reduced, and thus the zinc dendrite can be suppressed from further extending.

Figure 3:
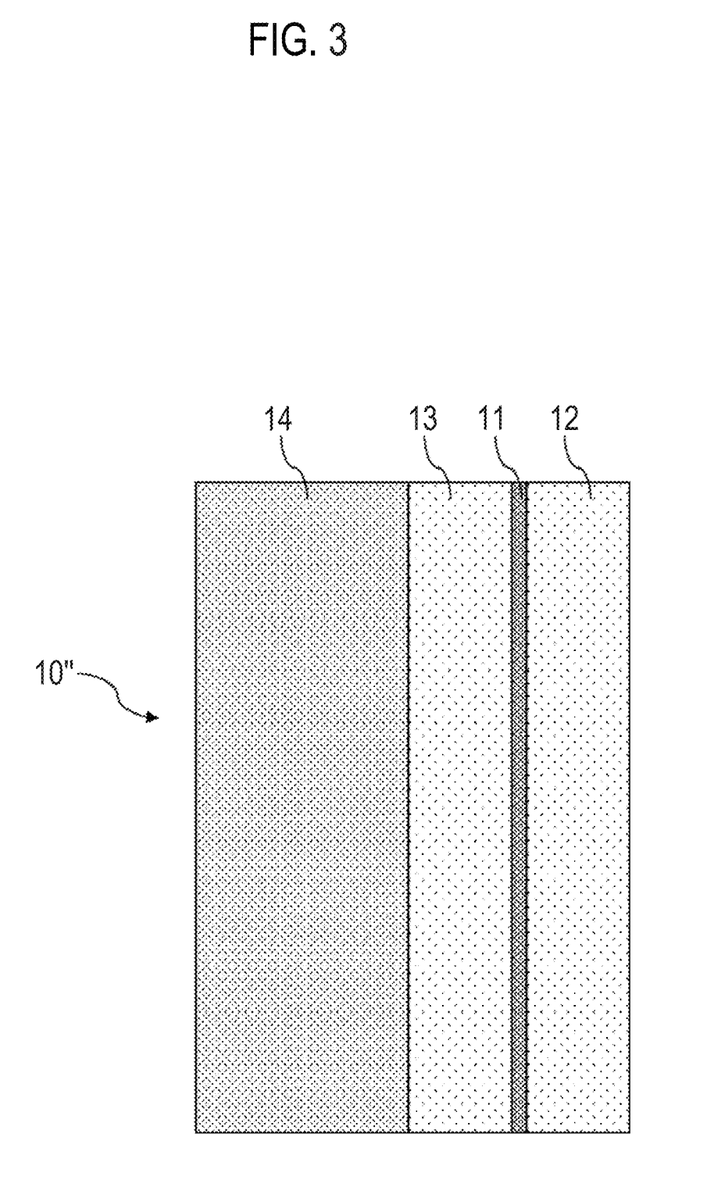
FIG. 3 is a schematic view showing a separator 10" for a zinc secondary battery according to a third embodiment of the present disclosure.

FIG. 3 shows a separator 10" for a zinc secondary battery according to a third embodiment of the present disclosure.

As shown in FIG. 3, in the separator 10" for the zinc secondary battery according to the third embodiment of the present disclosure, a nonwoven fabric layer 14, the porous base material layer 13, the zirconium sulfate-containing porous layer 11 and the porous base material layer 12 are stacked in this order.

Note that FIG. 3 is not intended to limit the separator for the zinc secondary battery according to the present disclosure.

Zirconium Sulfate-Containing Porous Layer

The zirconium sulfate-containing porous layer is a porous layer that contains zirconium sulfate. Zirconium sulfate can be contained in the zirconium sulfate-containing porous layer as, for example, particles.

Note that meaning of "porous" of the zirconium sulfate-containing porous layer is that a plurality of through holes that penetrate the front and back surfaces of the layer is provided.

The zirconium sulfate-containing porous layer can be formed, for example, by adhering a slurry in which zirconium sulfate particles are dispersed in a dispersion medium onto the porous layer, for example, the porous base material layer described below and drying the adhered slurry. The method of adhering the slurry onto the porous layer is not particularly limited, and can be performed by a known method, such as screen printing, immersion, and coating, more specifically, doctor blade coating. Note that a part or all of the zirconium sulfate-containing porous layer may be integrated with the porous layer.

Note that the slurry may contain, in addition to zirconium sulfate, a binder, such as styrene-butadiene rubber (SBR) or a thickener, such as carboxymethyl cellulose (CMC).

In a case where the zirconium sulfate-containing porous layer contains the zirconium sulfate particles, an average primary particle diameter of the zirconium sulfate particles may be 10 nm to 1000 µm.

The average primary particle diameter of the zirconium sulfate particles may be 10 nm or greater, 100 nm or greater, 10 µm or greater, or 50 µm or greater, and may be 1000 µm or smaller, 500 µm or smaller, 250 µm or smaller, or 100 µm or smaller.

Note that the average primary particle diameter of the zirconium sulfate particles can be obtained as an area circle equivalent diameter by observation with a scanning electron microscope (SEM). It is preferable that the number of samples be large. For example, the number of samples is 20 or greater, and may be 50 or greater or 100 or greater.

The average primary particle diameter of the zirconium sulfate particles may be appropriately decided by those skilled in the art depending on a porosity and a pore diameter requested for the zirconium sulfate-containing porous layer. The porosity and an average pore diameter of the zirconium sulfate-containing porous layer tend to be increased as the average primary particle diameter of the zirconium sulfate particles is large, and the porosity and the average pore diameter of the zirconium sulfate-containing porous layer tends to be decreased as the average primary particle diameter of the zirconium sulfate particles is small.

Note that the porosity and the average pore diameter requested for the zirconium sulfate-containing porous layer may be the porosity and the average pore diameter generally requested for the separator for the zinc secondary battery.

A thickness of the zirconium sulfate-containing porous layer may be, for example, 10 µm to 1000 µm. The thickness of the zirconium sulfate-containing porous layer may be 10 µm or greater, 50 µm or greater, or 100 µm or greater, and may be 1000 µm or smaller, 500 µm or smaller, or 200 µm or smaller.

Porous Base Material Layer

The porous base material layer is a porous layer that has insulating property and includes the through holes that penetrate both surface of the film. The porous base material layer may be hydrophobic or hydrophilic.

The porosity and the average pore diameter of the porous base material layer may be the porosity and the average pore diameter generally requested for the separator for the zinc secondary battery.

A thickness of the porous base material layer may be, for example, 10 µm to 1000 µm. The thickness of the porous base material layer may be 10 µm or greater, 50 µm or greater, or 100 µm or greater, and may be 1000 µm or smaller, 500 µm or smaller, or 200 µm or smaller.

As the porous base material layer, for example, a resin porous layer, more specifically, a polyolefin-based porous layer, a polyamide-based porous layer, or a nylon-based porous layer can be used, but the porous base material layer is not limited to this.

Here, a porous resin film may be subjected to hydrophilic treatment by, for example, imparting a hydrophilic functional group.

Note that meaning of "porous" of the porous base material layer is that the through holes that penetrate the front and back surfaces of the layer are provided. Therefore, the porous base material layer may be, for example, a spongy layer.

Nonwoven Fabric Layer

The nonwoven fabric layer may be, for example, a cellulosic nonwoven fabric.

Zinc Secondary Battery

A zinc secondary battery according to the present disclosure includes the separator for the zinc secondary battery according to the present disclosure.

The zinc secondary battery according to the present disclosure can have a known configuration except that the separator for the zinc secondary battery according to the present disclosure is adopted as the separator.

The zinc secondary battery according to the present disclosure may be the zinc secondary battery in which the negative electrode body, the separator for the zinc secondary battery, and the positive electrode body are provided in this order, and the negative electrode body, the separator for the zinc secondary battery, and the positive electrode body are impregnated with an electrolyte.

Typically, the zinc secondary battery according to the present disclosure is, for example, the zinc secondary battery in which the negative electrode body, the separator, and the positive electrode body may be accommodated in the battery case in this order and the battery case may be filled with the electrolyte. More specific examples of the zinc secondary battery according to the present disclosure include a nickel-zinc secondary battery, a silver oxide-zinc secondary battery, a manganese oxide-zinc secondary battery, a zinc-air secondary battery, and other various alkaline zinc secondary batteries.

Figure 4:
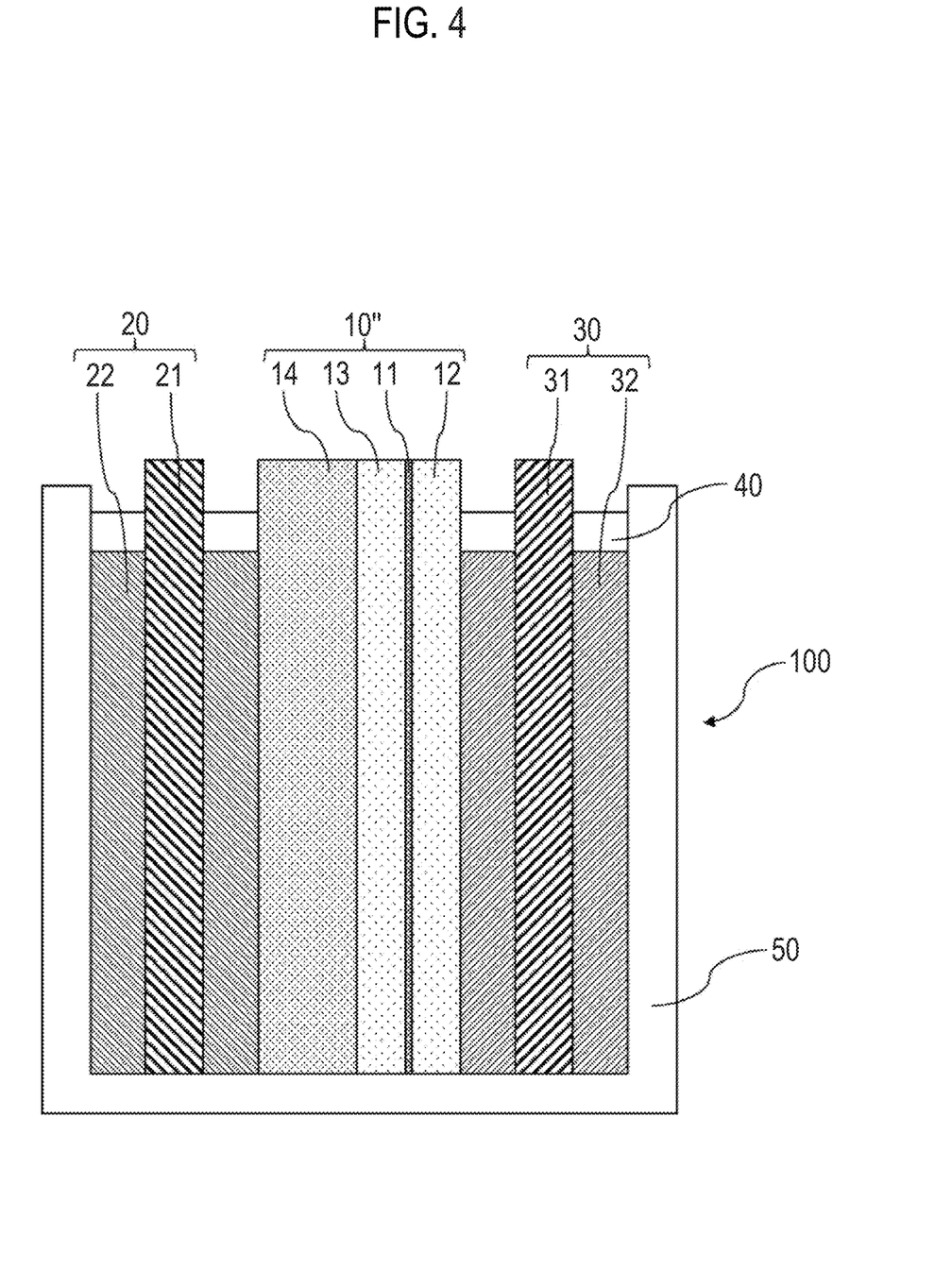
FIG. 4 is a schematic view showing a zinc secondary battery 100 according to the first embodiment of the present disclosure.

FIG. 4 shows a zinc secondary battery 100 according to the first embodiment of the present disclosure.

As shown in FIG. 4, in the zinc secondary battery 100 according to the first embodiment of the present disclosure, a negative electrode body 20, the separator 10" for the zinc secondary battery according to the third embodiment of the present disclosure, and a positive electrode body 30 are stacked in this order. Further, these components are accommodated in a battery case 50 that is filled with an electrolyte 40.

Note that the negative electrode body 20 has a configuration in which a negative electrode active material layer 22 is formed on a negative electrode current collector 21. Further, the positive electrode body 30 has a configuration in which a positive electrode active material layer 32 is formed on a positive electrode current collector 31.

Negative Electrode Body

Examples of the negative electrode body include a negative electrode body in which the surface of the negative electrode current collector is coated with a zinc-based negative electrode active material layer.

Here, the negative electrode current collector may be a conductive material, for example, a metal, such as stainless steel, aluminum, copper, nickel, iron, or titanium, or carbon, but is not limited to this. The material of the negative electrode current collector may be copper.

A shape of the current collector is not particularly limited, and examples thereof include a rod shape, a foil shape, a plate shape, a mesh shape, or a porous body. The current collector may be Celmet of metal.

The zinc-based negative electrode active material layer contains zinc and zinc oxide, and optionally the binder and other additives. The zinc-based negative electrode active material layer can further contain a zinc compound, such as calcium zincate.

Examples of the binder include styrene-butadiene rubber (SBR) or the like, but the binder is not limited to this.

Separator for Zinc Secondary Battery

The zinc secondary battery according to the present disclosure includes the separator for the zinc secondary battery according to the present disclosure.

Positive Electrode Body

Examples of the positive electrode body include a positive electrode body in which the surface of the positive electrode current collector is coated with a zinc-based positive electrode active material layer.

Here, as for the positive electrode current collector, the description of the negative electrode current collector can be referred to by replacing the negative electrode current collector with the positive electrode current collector. The material of the positive electrode current collector may be aluminum. In a case where the material of the positive electrode current collector is nickel, the positive electrode current collector may be Celmet of nickel.

The positive electrode active material layer contains a positive electrode active material, and optionally the binder and other additives. The positive electrode active material can be appropriately selected depending on the kind of the zinc secondary battery. For example, in a case where the zinc secondary battery is a nickel-zinc secondary battery, the positive electrode active material can contain nickel hydroxide and/or nickel oxyhydroxide.

As for the binder, the description of the negative electrode body can be referred to.

Electrolyte

The electrolyte can be an aqueous solution, more specifically, the alkaline electrolyte. Examples of the alkaline electrolyte include an electrolyte that contains an alkaline metal hydroxide, more specifically, potassium hydroxide, sodium hydroxide, lithium hydroxide, or ammonium hydroxide. As the electrolyte, potassium hydroxide is preferable. The electrolyte can further contain other inorganic and organic additives.

Further, zinc oxide can be dissolved in the electrolyte. Zinc oxide may be dissolved in the electrolyte in a saturated state at a room temperature.

Example 1 and Comparative Examples 1 to 9

Example 1

A separator for a zinc secondary battery of Example 1 was prepared as follows.

Ink Preparation

A zirconium sulfate powder, styrene-butadiene rubber (SBR), and carboxymethyl cellulose (CMC) were weighed respectively such that a mass ratio thereof in the zirconium sulfate-containing porous layer to be formed was zirconium sulfate powder:SBR:CMC=97:2.5:0.5.

The zirconium sulfate powder and CMC were placed in a mortar and kneaded. Thereafter, the kneaded material was put into a container and stirred with THINKY MIXER (manufactured by THINKY CORPORATION) for 1 minute at 2000 rpm. Next, SBR was added to the kneaded material and the mixture was stirred with THINKY MIXER (manufactured by THINKY CORPORATION) for 3 minutes at 2000 rpm to prepare an ink.

Formation of Zirconium Sulfate-Containing Porous Layer

A polypropylene separator as the porous base material layer was attached onto a glass substrate with a masking tape in a state of being pulled from both ends in the vertical direction while applying some tension. Note that the polypropylene separator was subjected to hydrophilic treatment in advance.

The ink was applied to the surface of the polypropylene separator by a doctor blade coating method. Note that a blade gap was 125 μm. Thereafter, the applied ink was naturally dried, and further dried in a vacuum dryer at 40° C. for 10 hours. As a result, the zirconium sulfate-containing porous layer was formed on the polypropylene separator.

Assembly of Separator

Another polypropylene separator that was subjected to hydrophilic treatment was disposed on the zirconium sulfate-containing porous layer, and a nonwoven fabric separator that was subjected to hydrophilic treatment was further disposed on the polypropylene separator to prepare the separator of Example 1.

The separator of Example 1 had a configuration in which the nonwoven fabric separator, the polypropylene separator, the zirconium sulfate-containing porous layer, and the polypropylene separator were stacked in this order.

Comparative Example 1

A separator of Comparative Example 1 was prepared in the same manner as in Example 1 except that the zirconium sulfate-containing porous layer was not formed on the polypropylene separator.

The separator of Comparative Example 1 had a configuration in which the nonwoven fabric separator, the polypropylene separator, and the polypropylene separator were stacked in this order.

Comparative Examples 2 to 9

Separators of Comparative Examples 2 to 9 were prepared in the same manner as in Example 1 except that titanium oxide, hafnium oxide, bismuth trioxide, calcium carbonate, calcium sulfate, cobalt sulfate, strontium sulfate, and bismuth sulfate were used in Comparative Examples 2 to 9 respectively, instead of zirconium sulfate.

That is, the separator of Comparative Example 2 had a configuration in which the nonwoven fabric separator, the polypropylene separator, a titanium oxide-containing porous layer, and the polypropylene separator were stacked in this order.

Further, the separator of Comparative Example 3 had a configuration in which the nonwoven fabric separator, the polypropylene separator, a hafnium oxide-containing porous layer, and the polypropylene separator were stacked in this order.

Further, the separator of Comparative Example 4 had a configuration in which the nonwoven fabric separator, the polypropylene separator, a bismuth trioxide-containing porous layer, and the polypropylene separator were stacked in this order.

Further, the separator of Comparative Example 5 had a configuration in which the nonwoven fabric separator, the polypropylene separator, a calcium carbonate-containing porous layer, and the polypropylene separator were stacked in this order.

Further, the separator of Comparative Example 6 had a configuration in which the nonwoven fabric separator, the polypropylene separator, a calcium sulfate-containing porous layer, and the polypropylene separator were stacked in this order.

Further, the separator of Comparative Example 7 had a configuration in which the nonwoven fabric separator, the polypropylene separator, a cobalt sulfate-containing porous layer, and the polypropylene separator were stacked in this order.

Further, the separator of Comparative Example 8 had a configuration in which the nonwoven fabric separator, the polypropylene separator, a strontium sulfate-containing porous layer, and the polypropylene separator were stacked in this order.

Further, the separator of Comparative Example 9 had a configuration in which the nonwoven fabric separator, the polypropylene separator, a bismuth sulfate-containing porous layer, and the polypropylene separator were stacked in this order.

Manufacturing of Zinc Secondary Battery

Nickel-zinc secondary batteries in which the separators of Examples were adopted were respectively manufactured as follows.

Positive Electrode Body $Ni(OH)_2$, SBR, and CMC were weighed respectively such that the mass ratio thereof was $Ni(OH)_2$:SBR:CMC=97:2.5:0.5. Note that $Ni(OH)_2$ contained an auxiliary agent.

These materials were kneaded in a mortar, water was added to adjust the hardness, and then the mixture was stirred with THINKY MIXER (manufactured by THINKY CORPORATION) for 1 minute at 2000 rpm to prepare a positive electrode active material slurry.

The positive electrode active material slurry was applied to the surface of nickel foil as the positive electrode current collector by the doctor blade coating method. Thereafter, the applied positive electrode active material slurry was naturally dried, and further dried at 80° C. overnight in a reduced pressure environment. As a result, the positive electrode body was formed.

Negative Electrode Body

ZnO, Zn, SBR, and CMC were weighed respectively such that the mass ratio thereof was ZnO:Zn:SBR:CMC=76:21:2.5:0.5.

These materials were kneaded in a mortar, water was added to adjust the hardness, and then the mixture was stirred with THINKY MIXER (manufactured by THINKY CORPORATION) for 1 minute at 2000 rpm to prepare a negative electrode active material slurry.

The negative electrode active material slurry was applied to the surface of copper foil as the negative electrode current collector by the doctor blade coating method. Thereafter, the applied negative electrode active material slurry was naturally dried, and further dried at 80° C. overnight in a reduced pressure environment. As a result, the negative electrode body was formed.

Assembly of Zinc Secondary Battery

The positive electrode body, the separator, and the negative electrode body were stacked in this order and accommodated in the battery case. Thereafter, the battery case was filled with the electrolyte to obtain the zinc secondary battery. The separator was disposed such that the nonwoven fabric layer faces the negative electrode body side. Further, the electrolyte was a 6 mol/L of KOH aqueous solution in which ZnO was dissolved in a saturated state at 25° C.

Cycle Stability Evaluation

A cycle test was performed for each of the nickel-zinc secondary batteries in which the separators of Examples were adopted, and the number of cycles until the short circuit was measured.

An electrochemical measurement system (VMP3, manufactured by Bio-Logic) and a thermostatic oven (SU-642, manufactured by ESPEC CORPORATION) were used for the cycle test. The temperature of each nickel-zinc secondary battery at the time of measurement was 25° C.

The cycle test was performed in a charge and discharge range of 0% to 50% of a state of charge (SOC) in a case where a theoretical charge capacity of the positive electrode active material layer was 100%. AC rate was 3.5 $mA/cm^2$. A cut voltage was 2 V at the time of charging and 1.3 V at the time of discharging. The cycle test was performed at an interval of 5 minutes for each cycle.

Result

The configuration of the separator and a result of the cycle stability evaluation of each Example are shown in Table 1 below. Note that in the result of the cycle stability evaluation, the number of cycles until the short circuit in Comparative Example 1 is described as 100%.

TABLE 1

| | Configuration | | | | Result |
|---|---|---|---|---|---|
| Example | Porous base material layer | Intermediate layer | Porous base material layer | Nonwoven fabric layer | Durability (%) |
| Example 1 | Polypropylene porous layer | Zirconium sulfate-containing porous layer | Polypropylene porous layer | Cellulosic nonwoven fabric layer | 217 |
| Comparative Example 1 | Polypropylene porous layer | Absence | Polypropylene porous layer | Cellulosic nonwoven fabric layer | 100 |
| Comparative Example 2 | Polypropylene porous layer | Titanium oxide-containing porous layer | Polypropylene porous layer | Cellulosic nonwoven fabric layer | 116 |
| Comparative Example 3 | Polypropylene porous layer | Hafnium oxide-containing porous layer | Polypropylene porous layer | Cellulosic nonwoven fabric layer | 82 |
| Comparative Example 4 | Polypropylene porous layer | Bismuth trioxide-containing porous layer | Polypropylene porous layer | Cellulosic nonwoven fabric layer | 20 |
| Comparative Example 5 | Polypropylene porous layer | Calcium carbonate-containing porous layer | Polypropylene porous layer | Cellulosic nonwoven fabric layer | 77 |
| Comparative Example 6 | Polypropylene porous layer | Calcium sulfate-containing porous layer | Polypropylene porous layer | Cellulosic nonwoven fabric layer | 3 |

TABLE 1-continued

| Example | Configuration Porous base material layer | Intermediate layer | Porous base material layer | Nonwoven fabric layer | Result Durability (%) |
|---|---|---|---|---|---|
| Comparative Example 7 | Polypropylene porous layer | Cobalt sulfate-containing porous layer | Polypropylene porous layer | Cellulosic nonwoven fabric layer | 33 |
| Comparative Example 8 | Polypropylene porous layer | Strontium sulfate-containing porous layer | Polypropylene porous layer | Cellulosic nonwoven fabric layer | 0 |
| Comparative Example 9 | Polypropylene porous layer | Bismuth sulfate-containing porous layer | Polypropylene porous layer | Cellulosic nonwoven fabric layer | 7 |

As shown in Table 1, in Example 1 in which the zirconium sulfate-containing porous layer is provided, the durability was 217%, and the durability was significantly improved from Comparative Example 1.

In Comparative Example 2 in which the titanium oxide-containing porous layer is provided, the durability was 116% and was slightly improved from Comparative Example 1. However, it can be said that the improvement of durability in Comparative Example 2 is not significant as compared with Example 1.

In Comparative Examples 3 to 9, the durability was 82%, 20, 77%, 3%, 33%, 0%, and 7%, respectively, and was lower than that in Comparative Example 1. Note that 0% in Comparative Example 8 indicates that the durability was much lower than that of Comparative Example 1 and that the short circuit occurred immediately after the start of the cycle test.

What is claimed is:

1. A zinc secondary battery, comprising
a negative electrode body, a separator for the zinc secondary battery, and a positive electrode body provided in this order,
wherein the negative electrode body, the separator for the zinc secondary battery, and the positive electrode body are impregnated with an electrolyte,
wherein the negative electrode body comprises a negative electrode active material layer including zinc and zinc oxide,
wherein the positive electrode body comprises a positive electrode active material layer including at least one nickel hydroxide or nickel oxyhydroxide,
wherein the separator for the zinc secondary battery comprises a zirconium sulfate-containing porous layer and at least one porous base material layer that are stacked on each other,
wherein the zirconium sulfate-containing porous layer comprises a porous layer with zirconium sulfate particles adhered to the porous layer, and
wherein the at least one porous base material layer comprises a first porous base material layer and a second porous base material layer, and wherein the first porous base material layer, the zirconium sulfate-containing porous layer, and the second porous base material layer are stacked in this order.

2. The zinc secondary battery according to claim 1, wherein the separator further comprises a nonwoven fabric layer, and wherein the first porous base material layer, the zirconium sulfate-containing porous layer, the second porous base material layer, and the nonwoven fabric layer are stacked in this order.

3. The zinc secondary battery according to claim 1, wherein the porous base material layer is a resin porous layer.

4. The zinc secondary battery according to claim 3, wherein the resin porous layer is a polyolefin-based porous layer, a polyamide-based porous layer, or a nylon-based porous layer.

5. The zinc secondary battery according to claim 1, wherein the electrolyte is an aqueous solution.

6. The zinc secondary battery according to claim 1, wherein the electrolyte is an alkaline electrolyte.

7. The zinc secondary battery according to claim 1, wherein zinc oxide is dissolved in the electrolyte.

* * * * *